United States Patent [19]

Marentic et al.

[11] Patent Number: 5,069,403
[45] Date of Patent: Dec. 3, 1991

[54] DRAG REDUCTION ARTICLE

[75] Inventors: Francis J. Marentic, Lake Elmo; Terry L. Morris, St. Paul, both of Minn.

[73] Assignee: Minnesota Mining and Manufacturing Company, St. Paul, Minn.

[21] Appl. No.: 517,757

[22] Filed: May 2, 1990

Related U.S. Application Data

[63] Continuation of Ser. No. 740,239, May 31, 1985, Pat. No. 4,986,496.

[51] Int. Cl.$^5$ .......................................... B64C 21/10
[52] U.S. Cl. .................................. 244/130; 244/200
[58] Field of Search ............... 244/130, 200; 428/137, 428/346, 480

[56] References Cited

U.S. PATENT DOCUMENTS

| | | | |
|---|---|---|---|
| Re. 24,906 | 12/1960 | Ulrich | 428/480 |
| 2,742,247 | 4/1956 | Lachmann | 244/130 |
| 2,925,174 | 2/1960 | Stow | 428/346 |
| 2,925,231 | 2/1960 | Pfaff, Jr. et al. | 244/209 |
| 2,971,301 | 2/1961 | Boggs | 244/200 |
| 3,117,751 | 1/1964 | Rogers et al. | 244/130 X |
| 3,521,837 | 7/1970 | Papst | 244/200 |
| 3,588,005 | 6/1971 | Rethorst | 244/200 |
| 4,114,836 | 9/1978 | Graham et al. | 244/130 |
| 4,258,889 | 3/1981 | Hunt | 244/130 |
| 4,296,899 | 10/1981 | Isenberg | 244/130 |
| 4,434,957 | 3/1984 | Meritz | 244/130 |
| 4,455,045 | 6/1984 | Wheeler | 244/200 |
| 4,650,138 | 3/1987 | Grose | 244/200 X |
| 4,706,910 | 11/1987 | Walsh et al. | 244/200 X |
| 4,736,912 | 4/1988 | Loebert | 244/200 X |
| 4,753,401 | 6/1988 | Bechert | 244/200 X |
| 4,759,516 | 7/1988 | Grose | 244/200 X |
| 4,863,121 | 9/1989 | Savill | 244/200 |
| 4,865,271 | 9/1989 | Savill | 244/200 X |
| 4,907,765 | 3/1990 | Hirschel et al. | 244/200 |
| 4,930,729 | 6/1990 | Savill | 244/200 |
| 4,932,612 | 6/1990 | Blackwelder et al. | 244/200 X |

FOREIGN PATENT DOCUMENTS

| | | | |
|---|---|---|---|
| 462224 | 7/1973 | Australia . | |
| 0008971 | 3/1980 | European Pat. Off. | 428/137 |
| 0086474 | 8/1983 | European Pat. Off. . | |
| 0127192 | 5/1984 | European Pat. Off. . | |
| 205289 | 12/1986 | European Pat. Off. | 244/200 |
| 354022 | 2/1990 | European Pat. Off. | 244/130 |
| 0053573 | 3/1984 | Japan | 428/137 |
| 80/01683 | 8/1980 | PCT Int'l Appl. . | |
| 1162171 | 8/1969 | United Kingdom . | |
| 2076741 | 12/1981 | United Kingdom | 428/137 |
| 2210011 | 6/1989 | United Kingdom | 244/200 |

OTHER PUBLICATIONS

Walsh, "Drag Characteristics of V-Groove and Transverse Curvature Riblets", Symposium on viscous Drag Reduction, Dallas, Nov. 7-8, 1979.
Bacher et al., "A Combined Visualization-Anemometry Study of the Turbulent Drag Reducing Mechanisms of Triangular Micro-Groove Surface Modifications", AIAA'85-AIAA-85-0548, Mar. 12-14, 1985.
Automotive Engineering, Feb. 1982, pp. 73-78.
The Christian Science Monitor, Feb. 10, 1984, p. 4.
Research & Development, Mar. 1984, pp. 74-76.
Discover, Apr. 1984, p. 71.
Boeing Material Specification, BMS 10-30A, pp. 1-7.
Handbook of Plastics & Elastomers, pp. 1-3.
Encyclopedia of Polymer Science and Technology, vol. 4, pp. 336-337.
Encyclopedia of Polymer Science and Engineering, vol. 4, pp. 357-358.
McGraw-Hill. Encyclopedia of Science and Technology, vols. 14, 19, pp. 169-171, 227.
Kirk-Othmer, Encyclopedia of Chemical Technology, Third Edition, vols. 19, 23, pp. 607, 771 and 835.
Modern Plastics Encyclopedia, Oct. 1987, vol. 64, No. 10A.
Modern Plastics Encyclopedia, 1977-1978, pp. 340-348.
"Grooves Reduce Aircraft Drag", NASA Tech. Brief, vol. 5, No. 2, Summer 1980.

Primary Examiner—Margaret A. Focarino
Assistant Examiner—James M. Kannofsky
Attorney, Agent, or Firm—Gary L. Griswold; Walter N. Kirn; James V. Lilly

[57] ABSTRACT

A conformable drag reduction article is provided having a patterned surface capable of reducing drag resistance by fluid flowing thereover.

10 Claims, 1 Drawing Sheet

DRAG REDUCTION ARTICLE

This is a continuation of application Ser. No. 06/740,239 filed May 31, 1985 and now U.S. Pat. No. 4,986,496.

TECHNICAL FIELD

This invention relates to the reduction of drag caused by fluids (e.g., air, gas, water, etc.) flowing across surfaces. More particularly it relates to articles which can be applied to surfaces to reduce such drag.

BACKGROUND ART

It has long been a desire to reduce drag caused by the passage of bodies through fluid media. Relatively small reductions in drag can significantly reduce the fuel needed to propel a body. For example, it has been estimated that a one percent reduction in drag across the leading edge of a wing of a Boeing 727 airliner could reduce fuel consumption by more than 20,000 gallons per airplane per year. See *Automotive Engineering*, Feb., 1982, pp. 73.

The reduction of drag across surfaces of a body also is of benefit in other applications. By way of example, it is desirable to reduce the drag caused by water flowing past the hull of a boat, air flowing past a moving automobile or air flowing past the blades of a windmill fan, airfoil, fan, rotor, stator, inlet, etc. Many other examples are of course known as will be appreciated by those in the art. However, as yet there has not been provided a practical solution to the problem of reducing drag.

Many techniques have been proposed which involve mechanically altering flow control surfaces. For example, the utilization of various devices to direct air into ducts that exit at the trailing edges of the flow control surface has been suggested. See, for example, U.S. Pat. Nos. 2,742,247; 2,925,231; 3,117,751; 3,521,837; 4,114,836; 4,258,889; and 4,296,899.

U.S. Pat. No. 4,434,957 suggests the use of a corrugated control surface. The corrugations that extend transversely to the direction of the fluid flow, temporarily retain vortices formed in the fluid flow on the flow control surface, and aid in regulating their passage across the surface.

U.S. Pat. No. 4,455,045 proposes the use of one or more 3-sided submerged channels in the flow control surface. Each channel includes two divergent walls which form a generally V-shaped ramp which is sloped downward so that the channel widens and deepens toward the downstream flow of the fluid. Such channels are V-shaped in a plane generally parallel to the flow control surface. They are intricate and are most effective when provided in a serial cascade wherein the last channel in the cascade ends at the trailing edge of the flow control surface.

These techniques are expensive, time consuming to employ and do not address the problem of how to reduce drag across the surfaces of existing equipment (e.g., airplanes, automobiles, etc.) in a practical way.

The use of smooth surface coatings on airplane skins has also been suggested. See *Automotive Engineering*, Feb., 1982, pp. 73-78. However, this article reported that liquid polymeric coatings and adhesively backed films, applied to the flow control surfaces in order to maintain a smooth, protected surface for drag reduction, performed poorly and were unsuitable for areas of high erosion such as wing and tail leading edges and nacelle inlets.

DISCLOSURE OF THE INVENTION

The present invention provides a practical technique for significantly reducing drag across flow control surfaces. The invention comprises a conformable sheet material which employs a patterned first surface to significantly reduce drag caused by fluid flowing over the surface of a body to which the sheet has been applied. As used herein, conformable means that the article assumes the shape of the surface to which it is applied without cracking or breaking and without the formation of any air bubbles or wrinkles. Additionally, it does not release from the surface even when it is under extreme stress, such as elongation and compression, once it has been applied. For example, the article of the invention will conform exactly to curved surfaces and riveted surfaces such as are encountered on the skin of an airplane.

In a preferred embodiment of the invention, the article is capable of withstanding extended exposure to water, oil, hydraulic fluids and the like without noticeable deterioration in its physical properties or appearance.

The article of the invention is convenient to use and provides a simple yet versatile technique for reducing drag across flow control surfaces. It can be applied to the flow control surfaces of existing equipment or it can e applied to flow control surfaces of new equipment at the time of manufacture. In either case the reduction in drag across the surface of such equipment is virtually identical.

The reduction of drag achieved by the article of the invention varies somewhat depending upon the body to which it is applied and the conditions at which the body operates. However, reductions in drag of up to 10% or more can be achieved with the present invention.

The present invention also provides a method for reducing drag caused by fluid flowing across flow control surfaces. The method includes the steps of positioning the article over the body so that the patterned surface will contact the fluid and provide maximum drag reduction; confirming the article too the shape of the body; and attaching the article to the body.

DETAILED DESCRIPTION

Figure 1:
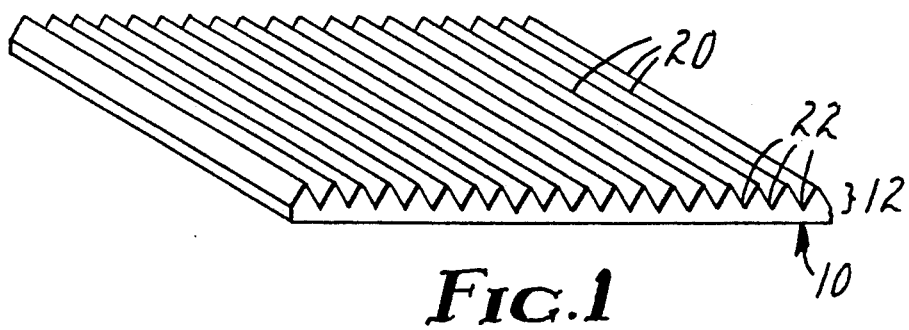
FIG. 1 is a perspective view of one embodiment of the invention.

The article of the invention may be characterized by a number of tests. For example, the article preferably has a tensile strength of greater than 200 kg/cm$^2$ when measured according to ASTM D 2370. The conformability of the article may be demonstrated by subjecting the article to flexibility tests MIL-P-38477A and MIL-M-43719B. Specifically, the article will show no change after being subjected to the following tests (a) folding the article 20 times at room temperature (e.g., 20° C.); (b) dropping a 2.3 kg steel ball onto the article from a height of 3 meters at a temperature of −29° C.; and (c) bending the article around a 2.5 cm mandrel at temperatures of from −54° C. to 121° C.

Preferred embodiments also exhibit resistance to a number of solvents. Thus, when tested according to MIL-M-43719B the preferred embodiment shows no change after one hour in jet fuel. When tested according to MIL-P-38477A the preferred embodiment shows no change after either 2 hours at 107° C. in hot oil or 240 hours in salt spray. When tested according to BMS-10-30A, the preferred embodiment of the invention will show no change after 72 hours in TT-S-735 hydrocarbon fluid. Additionally, the preferred embodiment will show less than 0.15 cm edge lift after 72 hours in MIL-L-7808 lubricating oil and less than 0.3 cm edge lift after 24 hours in BMS-3-11.

The article of the invention is typically a film (i.e., it has width to thickness ratio of at least 5:1). Generally it is from 50 to 650 microns thick. Preferably it is from 75 to 160 microns thick when used in high speed applications (e.g., aircraft) and from 150 to 500 microns thick when used in low speed applications (e.g., automobiles). Preferably the films have a weight of less than 300 $g/m^2$ and most preferably a weight of less than 150 $g/m^2$.

Within these guidelines, a number of materials can be utilized to provide the article of the invention. Useful materials include polyolefins (e.g., polyethylene, unoriented polypropylene, ethylene/vinyl acetate polymers, ethylene/ethyl acrylate polymers), vinyl polymers (e.g., polyvinyl chloride, vinyl chloride/vinyl acetate polymers, vinyl chloride/vinyl alcohol polymers, polyvinylidene chloride), polyurethanes (e.g., polyester and polyether urethanes), cellulosic films (e.g. cellulose acetate), and polyamide films (e.g., nylon).

Other materials which may be employed to provide the article are radiation curable materials which generally comprise a radiation curable monomer or prepolymer and an initiator. The monomer or prepolymer generally contains at least two groups capable of reacting to form a polymer. A variety of such materials are known and include materials having functional ethylenically unsaturated groups (e.g., vinyl groups, acrylate and methacrylate groups, etc.).

Plasticizers, extenders, antioxidants, ultraviolet light stabilizers and the like may be utilized in the article of the invention. Plasticizers (sometimes referred to as flexibilizers) are particularly helpful when the material used must be modified in order to meet the flexibility requirements of the invention. Materials useful for these purposes are known. Typically they each comprise up to 5 parts by weight of the article.

While the exact material used to provide the article of the invention is not critical, it is noted that certain materials will be better suited to some applications than others. For example, thermoset flexible materials will be better suited than thermoplastic materials in those uses where high temperatures will be encountered. Water-resistant (e.g., hydrolytically inert) materials will be better suited to use in water environments than water-sensitive materials.

The article of the invention may be inherently adhesive, that is it need not have a separate layer of adhesive applied to it. Such articles may be either passively adhesive or actively adhesive. In the former case the adhesive may be activated by solvents, heat, pressure, or the like prior to application of the article to a substrate. In the latter case, such activation would not be necessary.

In the event that a separate layer of adhesive is employed, it is noted that the adhesive may be selected from a wide variety of materials such as heat activated adhesives, solvent (organic or inorganic) activated adhesives, or pressure sensitive adhesives. These adhesives preferably are compatible with the carrier to which they are applied and are resistant to water, oil, hydraulic fluids and the like. Furthermore, the separate adhesive layer preferably does not separate from the carrier during use.

Pressure-sensitive adhesives represent a preferred adhesive for use as a separate layer. Examples of useful pressure-sensitive adhesives include polyacrylate adhesives, natural rubber adhesives and thermoplastic rubber adhesives.

Polyacrylate adhesives comprise a polymer of an acrylate ester of acrylic acid with a non-tertiary alcohol. These adhesives may also contain a minor amount of a copolymerized acid or amide. Adhesives of this type and methods for their preparation are known. See U.S. Pat. No. Re. 24,906.

The polyacrylate pressure-sensitive adhesives may be crosslinked if desired. Techniques for accomplishing this are known and described, for example, in U.S. Pat. No. 2,925,174.

Useful natural rubber adhesives comprise natural rubber and, preferably, a tackifying resin. One such adhesive comprises natural pale crepe rubber (100 parts by weight), polyterpene resin (75 parts by weight), and antioxidant (1 part by weight). However, other useful natural rubber adhesives are also useful and will be apparent to those skilled in the art.

Useful thermoplastic rubbery adhesives comprise a rubbery block copolymer and, preferably, at least one resin compatible with the block copolymer. The rubbery copolymers have the general configuration A-B-A wherein the A units represent a thermoplastic polymer block with a $T_g$ above 20° C. and the B units represent an elastomeric polymer block formed from a conjugated diene. The A units are relatively incompatible with the B units and have an average molecular weight of from about 5,000 to 125,000. Useful A units are styrene and useful B units are polybutadiene or polyisoprene. An example of block copolymer of this type is Shell Chemical Company Kraton 1101, a block copolymer of styrene and butadiene having one butadiene central block of 70,000 molecular weight and two terminal blocks of styrene of 15,000 molecular weight each. Other block copolymers of this type may also be used.

Resins compatible with the block copolymer are known and include, for example, hydrocarbon resins, coumarone-indene resins, dimerized rosins, metal resinates, hydrogenated rosins, poly-terpene resins and heat treated wood rosins. Still other resins are also useful and will be obvious to those skilled in the art.

The thickness of the adhesive layer is not critical to the present invention. Typically, the adhesive layer is from 10 to 50 microns thick.

Whether the article of the invention is inherently adhesive or uses a separate adhesive layer, it preferably adheres over the entire range of conditions normally encountered. Most preferably it exhibits a peel adhesion of at least 0.5 kg/cm width.

The article of the invention may be readily applied to a variety of substrates. Preferably the article is positioned on the substrate such that the patterned surface will provide maximum drag reduction. When the patterned surface comprises parallel peaks and valleys, maximum drag reduction is achieved when the peaks and valleys are generally parallel to the fluid flow. After being positioned, the article may be stretched, if necessary, to conform to the substrate surface and to remove unwanted wrinkles and air bubbles. The film is then adhesively secured to the surface.

Several embodiments of the invention are shown in the drawings. FIG. 1 illustrates an article of the invention comprising a sheet material 10 having a patterned first surface 12.

Figure 2:
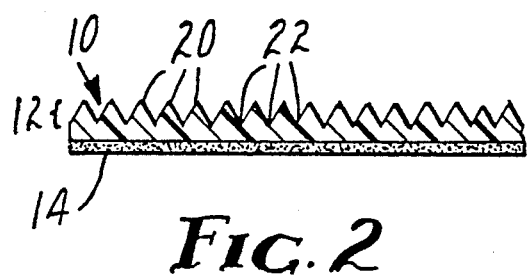
FIGS. 2 and 3 are cross sectional views of two alternative embodiments of the invention.

Sheet material 10 may be inherently adhesive or, alternatively, it may have an adhesive second layer 14 applied to the surface of the sheet opposite patterned surface 12 as shown in FIG. 2.

Figure 3:
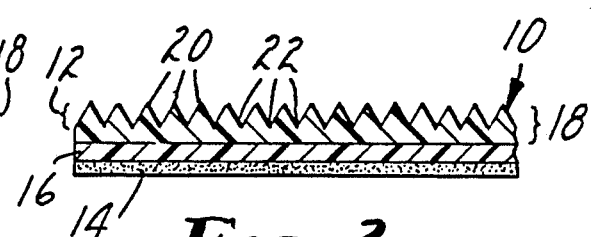

In yet another embodiment, shown in FIG. 3, the sheet material 10 comprises a carrier 16 and layer 18 bearing the patterned first surface 12. Adhesive second layer 14 may be provided on the surface of carrier 16 which is opposite the layer 18.

The patterned surface 12 shown in FIGS. 1-3 and 9 comprises a series of parallel peaks 20 and valleys 22. The patterned surfaces 12 shown in FIGS. 1-3 have a symmetric, saw tooth cross section.

FIGS. 4-8 illustrate a number of alternative patterned surfaces that may be used in the present invention.

In all of these embodiments, the patterned surfaces comprise a series of essentially parallel valleys separated by a series of essentially parallel peaks. As can be seen from FIGS. 1-9, the cross section of the patterned layer can have a variety of wave forms. For example, the embodiments of FIGS. 1, 2 and 3 have a symmetric saw tooth cross section comprising peaks 20 and valleys 22. All of the peaks are identical as are all of the valleys.

Figure 4:
FIGS. 4–8 represent greatly enlarged cross sectional views of alternative patterned surfaces useful in the invention.

FIG. 4 shows a series of parallel, symmetric, peaks 24 equally separated by flat bottomed valleys 26.

Figure 5:

FIG. 5 shows a series of alternating, parallel peaks 28 and 30 separated by parallel valleys 22. Peaks 28 and 30 are parallel to one another but are of alternating heights.

Figure 6:

FIG. 6 shows a pattern of repeating, parallel, symmetric, rounded peaks 32. These peaks are separated by a series of parallel, symmetric valleys 34.

Figure 7:

FIG. 7 shows a series of parallel, symmetric, peaks 36 having concave side walls. These peaks are separated from one another by a series of parallel, round bottomed valleys 38.

Figure 8:
Figure 9:
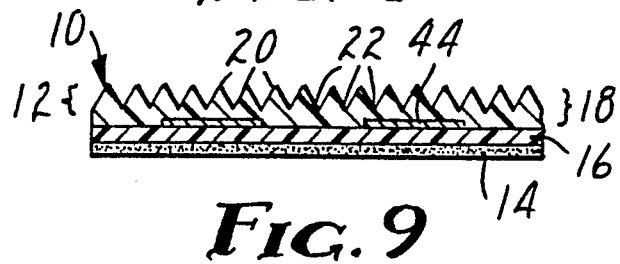
FIG. 9 represents a cross sectional view of the article of the invention bearing graphic indicia.

FIG. 8 shows a saw-tooth pattern of alternating, parallel, assymetric peaks 40 and assymetric valleys 42.

While only continuous peaks and valleys are shown, a discontinues pattern of peaks and valleys is also contemplated in this invention. Thus, for example, the peaks and valleys may terminate for a portion of the article. The valleys may either narrow or widen as the peak or valley progresses from one end of the article to the other. Still further, the height and/or width of a given peak or valley may change as the peak or valley progresses from one end of the article to the other.

The dimensions of the peaks and valleys are not critical to the invention provided that whatever patterned surface is employed provides a reduction in drag. The optimum dimensions are somewhat dependent upon the speed at which the substrate to be covered passes through the fluid. However, it has been found that peaks of from 20 to 400 microns high are useful. Within this broad range it is preferred that the peaks be from 20 to 150 microns high for high speed uses (e.g., aircraft) and from 120 to 380 microns high for slow speed uses (e.g., automobiles).

The peak to peak spacing between adjacent peaks likewise is not critical to the invention. It has been found that a spacing of from 20 to 400 microns is useful. Preferably the spacing is from 20 to 150 microns for high speed uses and from 120 to 380 microns for slow speed uses.

The included angle between adjacent peaks can also vary within the scope of this invention. For example, while flat and round bottom valleys are useful, it is preferred that the valleys be generally V-shaped and have an included angle of from 15° to 140° (more preferably from 50° to 60°).

The patterned surface 12 may be provided in-situ on the article of the invention (see FIGS. 1 and 2) or it may be applied thereto as layer 18 to carrier 16 (see FIG. 3). When layer 18 is employed to provide the patterned surface, the same or different materials may be used as are used for carrier 16. When selecting different materials for use as carrier 16 and layer 18 it is highly preferable that the two be compatible and either adhere together by themselves or be capable of being adhered together tenaciously. It is also preferred that the two materials have similar degrees of conformability so that stress at the interface between the two be minimized when the article is applied to a substrate.

In constructions such as are shown in FIG. 3, the carrier is typically from 20 to 250 microns thick and the patterned layer is from 20 to 400 microns thick.

The article of the invention may be prepared by several methods. For example, a sheet material may be extruded through a die capable of forming the patterned surface. Alternatively, the patterned surface may be formed by embossing techniques utilizing heat and/or pressure. Other techniques are also possible as will be understood by those in the art.

A specific useful embossing technique comprises extruding or casting a sheet material and contacting the sheet while it is still hot with an engraved, chilled cylinder which bears the negative structure of the desired patterned surface. The sheet may then be cooled on the cylinder.

Another useful technique comprises applying a radiation curable composition to a flexible carrier, contacting the radiation curable composition with a master bearing the negative structure of the desired pattern, and radiation curing the composition. The resulting structure may be removed from the master.

Yet another useful technique comprises preparing either an organosol or a plastisol composition, partially curing the composition (e.g., by applying heat), applying the partially cured organosol or plastisol to a flexible carrier, contacting the organosol or plastisol surface to a master bearing the negative structure of the desired pattern, and fully curing the organosol or plastisol. Organosol or plastisol may also be used to provide a sheet material such as shown in FIG. 1.

While the foregoing description discusses coating techniques for applying a patterned layer to a carrier, it is also possible to employ laminating techniques and/or adhesives to bond the two together.

Adhesive layers, when used, are applied to the surface of the article opposite the patterned surface. A variety of techniques, such as coating, spraying, or laminating, may be utilized to apply the adhesive layer.

One useful method of applying the adhesive comprises contacting the surface of the carrier opposite the patterned surface to an adhesive carried on a release liner and passing the construction between rubber rolls.

Either hot or cold lamination techniques can be employed.

The article of the invention may be provided as an opaque, translucent or transparent item. Graphic designs 44 may be incorporated into the article, see FIG. 9, preferably between the carrier and the patterned layer. Alternatively, they may be placed on the patterned surface. When the article of the invention is inherently adhesive, the graphic designs 44 may be placed on either major surface.

The article of the invention may be made breathable by, for example, perforating it. While the shape and type of the perforations are not of particular importance it is preferred that they be such that any adhesive used in the article does not flow together and seal the perforations. This can be achieved in many ways including, for example, by making the holes large enough to prevent such flow, and by deadening the adhesive around the walls of the perforations. Moreover, the perforations should not adversely affect the performance of the article, such as by causing it to separate from the substrate or by significantly adversely affecting its drag reduction capability.

With these parameters in mind, it is preferred that the perforations have a maximum dimension of less than 200 microns and preferably one in the range of 10 to 100 microns.

Laser drilling may be used to provide the perforations in the article. It has been found that the perforations provided by this technique are generally conical in shape and have a generally circular cross section. The size of the opening on the surface first struck by the laser is generally wider than that of the opposite surface. The size and shape of the opening is, of course, dependent upon the type of laser employed, the power of the laser, and the time of exposure to the laser beam.

The present invention will be further described in the following examples wherein all "parts" are parts by weight unless otherwise indicated. These examples are provided by way of illustration of the invention and not by way of limitation.

EXAMPLE 1

A drag reduction article according to the invention comprising an extruded film was prepared. A patterned carrier was prepared from the following ingredients:

| COMPONENTS | PARTS |
| --- | --- |
| Polyvinyl chloride resin ("Diamond" 426 available from B. F. Goodrich) | 100 |
| Monomeric phthalate ("Santicizer" 711 available from Monsanto) | 15 |
| Monomeric phthalate ("Santicizer" 160 available from Monsanto) | 4 |
| Epoxy resin plasticizer ("Paraplex" G-62 available from Rohm and Haas) | 4 |
| Barrium/Cadmium/Zinc ("Ferro" 5649 available from Ferro Corp.) | 0.5 |
| UV light absorber ("Mark" 1413 available from Argus Chemical) | 0.5 |
| Phosphite stabilizer ("Ferro" 5227 available from Ferro Corp.) | 0.5 |
| Octadecanoic acid (available from Humko) | 0.4 |
| Inorganic silica ("Syloid" 244 available from Davidson Chemical) | 1.0 |
| Violet dye ("Violet" ZIRS available from American Cyanamid) | 0.0073 |

The ingredients were mixed together and charged to a 30:1 length:diameter single screw (6.4 cm. diameter) extruder having a die with an 85 cm wide×0.7 cm high opening. The extruder screw had five zones maintained at, respectively, 170° C., 172° C., 174° C., 176° C., and 180° C. The hot extruded film was cat onto an engraved chilled cylinder. The cooled film replicated the groove pattern of the cylinder. The film was 76.3 cm wide by 0.05 cm thick and had a cross section of the type shown in FIG. 2. The patterned first surface comprised a series of parallel, triangularly shaped ridges extending along the longitudinal axis of the film. The height of the ridges was 300 microns, the peak-to-peak spacing between adjacent ridges was 500 microns, and the included angle between adjacent ridges was 53°.

A pressure sensitive adhesive was prepared as described in U.S. Pat. Re. No. 24,906 using a blend of 90 parts by weight 2-methyl butyl acrylate and 10 parts by weight acrylic acid.

The adhesive was applied to a silicone liner (SCW 106 from the General Electric Company) using a notched bar to a wet thickness of 125 microns at a coating speed of 51 meters/minute (m/min) and then dried in a forced air oven having four heated zones maintained respectively at 54° C., 65° C., 77° C. and 87° C. The adhesive was then laminated at room temperature to the second surface of the patterned carrier.

The resultant film was tested by removing the release liner and applying it to a curved surface. The film conformed exactly to the surface. The edges of the film did not curl away from the surface after application.

A portion of the film was applied to a flat metal plate and tested for drag reduction. The film provided a reduction in drag of 5% compared to the drag across a smooth flat metal plate.

EXAMPLE 2

A drag reduction article according to the invention comprising a separate patterned surface layer was prepared.

A cast vinyl carrier film was prepared from the formulation used in Example 1 to prepare the patterned carrier. The vinyl resin was applied to a removable paper liner (SCW 174 available from the General Electric Company) at a rate of 390 meters/minute. The vinyl resin was dried and fused in a five zone oven. The zones were maintained respectively at 46° C., 57° C., 143° C., 174° C., and 210° C. The film was cooled to provide a film which was 76.33 cm wide by 100 microns thick and the liner removed.

A plastisol coating was prepared from the following composition:

| COMPONENTS | PARTS |
| --- | --- |
| Polyvinyl chloride resin ("Geon" 128 available from B. F. Goodrich) | 54.6 |
| Diisodecyl phthalate (available from Monsanto Chemical) | 43.7 |
| Cadmium/Zinc ("Nuostab" 1923 available from Nuodex Tenneco) | 1.7 |

The plastisol coating was applied to a 40 cm width of a first surface of the carrier using a notched bar. The coated film was then dried at 37° C., embossed with an engraved cylinder using heat and pressure and then passed through a forced air oven at a rate of 3 meters/minute to fuse the plastisol. The oven had three zones maintained respectively at 37° C., 143° C., and 165° C. The resulting patterned surface had the cross section shown in FIG. 2 wherein the patterned surface layer was 300 microns high; the peak-to-peak spacing between adjacent ridges was 500 microns; and the included angle was 53°.

A pressure sensitive adhesive was applied to the surface of the vinyl carrier opposite the patterned surface using the formulation and techniques described in Example 1. When applied to a metal plate, the film conformed exactly to the plate and provided a 5% reduction in drag across the plate.

EXAMPLE 3

A drag reduction article according to the invention comprising a separate patterned layer was prepared which employed a cast vinyl film (prepared using the ingredients and techniques described in Example 2) and an organosol composition. The organosol composition was prepared from the following ingredients:

| COMPONENTS | PARTS |
|---|---|
| o- & m-Xylene | 12.42 |
| Diisobutyl Ketone | 9.4 |
| Mineral Spirits | 5.5 |
| Plasticizer ("Admex" 770 available from Sherex Corp.) | 16.4 |
| Cadmium/Zinc ("Nuostab" V1923 available from Nuodex Tenneco) | 2.2 |
| Substituted acrylonitrile ("Uvinul" N-539 available from Ciba Geigy) | 2.2 |
| Polyvinyl chloride resin ("Geon" 178 available from B. F. Goodrich) | 44.4 |
| Acrylic copolymer ("Elvacite" 2013 Solution available from DuPont) | 7.3 |

The coating was applied to a first surface of the carrier using a notched bar. The coating was then dried at 126° C., embossed with an engraved cylinder using heat and pressure, and fused in a forced air oven having two zones maintained respectively at 20° C. and 170° C.

The resulting patterned surface had a cross section of the type shown in FIG. 2 wherein the patterned surface layer was 80 microns high; the peak-to-peak distance between adjacent ridges was 200 microns; and the included angle was 53°.

A pressure sensitive adhesive was applied to the surface of the carrier opposite to the patterned surface using the formulation and the techniques described in Example 1. When applied to a metal plate, the film conformed exactly to the plate and provided a 5% reduction in drag across the plate.

EXAMPLE 4

A drag reduction film according to the invention was prepared by preparing a vinyl carrier from the vinyl composition of Example 1. The vinyl composition was coated onto a 75 micron thick polyester liner to a wet thickness of 100 microns and then passed through a forced air oven to dry it. The oven had five zones maintained respectively at 43° C., 99° C., 143° C., 149° C. and 182° C.

A radiation curable composition having the following ingredients was roll coated onto the vinyl film to a thickness of 300 microns.

| COMPONENTS | PARTS |
|---|---|
| Urethane acrylate oligomer ("XP51"-85 available from Cargile) | 67.9 |
| Tetraethylene glycol diacrylate ("SR"-268 available from | 19.2 |

| COMPONENTS | PARTS |
|---|---|
| Sartomer Company) | |
| Diethoxyacetophenone ("DEAP" available from Upjohn) | 4.8 |
| Fluorochemical surfactant ("FC"-431 available from Minnesota Mining and Manufacturing Company) | 2.7 |
| N-vinyl pyrrolidone (available from GAF) | 4.9 |
| UV light stabilizer ("Tinuvin" 770 available from Ciba Geigy) | 0.5 |

The resulting construction was then laminated to an engraved surface using a laminator pressure of 3 kg/cm² and a laminator speed of 9 meters/minute.

The radiation curable composition was exposed through the polyester and carrier to ultraviolet light in a Linde UV Processor from Union Carbide Corporation to cure it. Exposure conditions were:

Processor length: 2.4 meters
Processor speed: 9 meters/min.
UV Exposure level: 2 passes at 1.45 J/cm² ea.
Processor N₂ level: 220 ft³/hr. - ft. width The resulting construction was removed from the engraved surface revealing a patterned surface having a cross section similar to that of FIG. 2. The thickness of the patterned surface layer was 33 microns; the peak-to-peak distance between adjacent ridges was 33 microns; and the included angle was 53°. The polyester liner was then removed and a pressure sensitive adhesive laminated to the side of the carrier opposite the patterned surface using the materials and techniques described in Example 1.

The film was applied to a flow control surface on an airplane. The film conformed exactly to the surface and provided a 6.5% reduction in drag across the surface.

EXAMPLE 5

A drag reduction film was prepared. The radiation curable composition of Example 4 was applied to a polyester film and cured as described in Example 4 to provide a grooved liner. The grooved surface of the liner was treated with a release coating and a polyurethane composition having the following ingredients was applied to the patterned surface of the liner.

| COMPONENT | PARTS |
|---|---|
| Polyester polyol (available from Mobay Chemical as "Desmophen" 670) | 65.9 |
| 0.1 Second cellulose butyrate (available from Eastman Chemical as "CAB" 381-0.1) | 2.4 |
| Methyl isobutyl ketone | 10.9 |
| Polyglycol ether ester (Cellosolve acetate available from Dow Chemical Co.) | 16.8 |
| UV Stabilizer ("Irganox" 1010 available from Ciba Geigy) | 1 |
| UV Stabilizer ("Tinuvin" 328 available from Ciba Geigy) | 1 |
| UV Stabilizer ("Tinuvin" 770 available from Ciba Geigy) | 2 |
| Aliphatic isocyanate (Aliphatic isocyanate available from Mobay Chemical as "Desmodur" N-100) | 36.3 |
| Dibutyl Tin Dilaurate (1% by weight in Xylene) | 0.4 |

The polyurethane composition was cured to a tack free film by sequentially heating it to 65° C. for one minute, 107° C., for one minute 121° C. for one minute, and 163°

C. for one minute. The polyurethane was then fully cured by exposing it to room temperature for 7 days. The film was then stripped from the patterned liner and a presser sensitive adhesive applied as described in Example 1. The resulting drag reduction film could be applied to and conform to compound surfaces to reduce drag thereacross.

We claim:

1. A method for providing a drag reduction article comprising the steps of
   applying a layer of a first radiation curable composition to a carrier,
   forming a first patterned surface on said radiation curable composition,
   curing said first radiation curable composition by exposure to activating radiation to provide a first cured patterned surface capable of reducing drag resistance when a fluid flow thereacross.

2. A method according to claim 1 wherein said first patterned surface is formed by contacting said radiation curable composition to a negative of said first patterned surface.

3. A method according to claim 2 wherein said curing takes place while said first radiation curable composition contacts said negative of said first patterned surface.

4. A method according to claim 1 wherein said first cured patterned surface is covered with a layer of a second radiation curable composition and said second radiation curable composition is cured by exposure to activating radiation to form a second radiation-cured layer and said second radiation-cured layer is removed from said first patterned surface.

5. A method according to claim 4 wherein said steps of covering, curing and removing are repeated.

6. A method according to claim 4 wherein said second radiation curable composition comprises polyurethane.

7. A method according to claim 6 wherein said polyurethane is cured by exposure to heat.

8. A method according to claim 1 wherein said first radiation curable composition comprises a urethane-acrylate copolymer.

9. A method according to claim 8 wherein said urethane-acrylate copolymer is cured by exposure to electromagnetic radiation.

10. A method according to claim 9 wherein said electromagnetic radiation comprises ultraviolet light.

* * * * *

UNITED STATES PATENT AND TRADEMARK OFFICE
CERTIFICATE OF CORRECTION

PATENT NO. : 5,069,403

DATED : December 3, 1991

INVENTOR(S) : FRANCIS J. MARENTIC AND TERRY L. MORRIS

It is certified that error appears in the above-identified patent and that said Letters Patent is hereby corrected as shown below:

```
Col. 2, line 44, "confirming" should read --conforming--.
Col. 6, line 13, "in-situ" should read --in-situ--.
Col. 8, line 3, "cat" should read --cast--.
```

Signed and Sealed this

Sixth Day of April, 1993

Attest:

STEPHEN G. KUNIN

*Attesting Officer*     *Acting Commissioner of Patents and Trademarks*